`US 7,728,744 B2`

(12) United States Patent
Stein et al.

(10) Patent No.: US 7,728,744 B2
(45) Date of Patent: Jun. 1, 2010

(54) VARIABLE LENGTH DECODER SYSTEM AND METHOD

(75) Inventors: Yosef Stein, Sharon, MA (US);
Hazarathaiah Malepati, Norwood, MA (US)

(73) Assignee: Analog Devices, Inc., Norwood, MA (US)

( * ) Notice: Subject to any disclaimer, the term of this patent is extended or adjusted under 35 U.S.C. 154(b) by 35 days.

(21) Appl. No.: 11/900,968

(22) Filed: Sep. 13, 2007

(65) Prior Publication Data
US 2008/0010439 A1    Jan. 10, 2008

Related U.S. Application Data

(63) Continuation-in-part of application No. 11/258,801, filed on Oct. 26, 2005.

(51) Int. Cl.
*H03M 7/40* (2006.01)
*H03M 7/00* (2006.01)

(52) U.S. Cl. .................................... 341/67; 341/106
(58) Field of Classification Search ............... 341/67, 341/106
See application file for complete search history.

(56) References Cited

U.S. PATENT DOCUMENTS

| | | | |
|---|---|---|---|
| 3,303,477 A | 2/1967 | Voigt | |
| 3,805,037 A | 4/1974 | Ellison | |
| 3,959,638 A | 5/1976 | Blum et al. | |
| 4,757,506 A | 7/1988 | Heichler | |
| 5,031,131 A | 7/1991 | Mikos | |
| 5,062,057 A | 10/1991 | Blacken et al. | |
| 5,101,338 A | 3/1992 | Fujiwara et al. | |
| 5,260,898 A | 11/1993 | Richardson | |
| 5,287,511 A | 2/1994 | Robinson et al. | |
| 5,351,047 A | 9/1994 | Behlen | |
| 5,386,523 A | 1/1995 | Crook et al. | |
| 5,537,579 A | 7/1996 | Hiroyuki et al. | |
| 5,666,116 A * | 9/1997 | Bakhmutsky | 341/67 |
| 5,675,332 A * | 10/1997 | Limberg | 341/67 |
| 5,689,452 A | 11/1997 | Cameron | |
| 5,696,941 A | 12/1997 | Jung et al. | |
| 5,710,939 A | 1/1998 | Ballachino et al. | |
| 5,832,290 A | 11/1998 | Gostin et al. | |
| 5,961,640 A | 10/1999 | Chambers et al. | |
| 5,996,057 A | 11/1999 | Scales, III et al. | |
| 5,996,066 A | 11/1999 | Yung | |
| 6,009,499 A | 12/1999 | Koppala | |

(Continued)

OTHER PUBLICATIONS

Yadav et al., Software-Only Multiple Variable Length Decoding for Real-Time Video on MDSP, 0-7803-8838-0/05 2005 IEEE, pp. 141-142.

(Continued)

*Primary Examiner*—Jean B Jeanglaude
(74) *Attorney, Agent, or Firm*—Goodwin Procter LLP (57) ABSTRACT

Simultaneously decoding one or more variable length code symbols including storing in a bit FIFO at least a portion of a variable length coded bit stream; storing a succession of extracted bit fields of predetermined bit length from the variable length coded bit stream in the bit FIFO; defining at least one inspection field in the extracted bit field, each inspection field identifying at least one variable length code symbol; and storing in look-up table a decode value uniquely addressable by each bit combination of the inspection field for reading out the one or more decode values corresponding to the unique address defined by the inspection field.

41 Claims, 9 Drawing Sheets

U.S. PATENT DOCUMENTS

| | | | |
|---|---|---|---|
| 6,061,749 | A | 5/2000 | Webb et al. |
| 6,067,609 | A | 5/2000 | Meeker et al. |
| 6,094,726 | A | 7/2000 | Gonion et al. |
| 6,134,676 | A * | 10/2000 | VanHuben et al. ............ 714/39 |
| 6,138,208 | A | 10/2000 | Dhong et al. |
| 6,151,705 | A | 11/2000 | Santhanam |
| 6,223,320 | B1 | 4/2001 | Dubey et al. |
| 6,230,179 | B1 | 5/2001 | Dworkin et al. |
| 6,272,452 | B1 * | 8/2001 | Wu et al. ..................... 703/24 |
| 6,285,607 | B1 | 9/2001 | Sinclair |
| 6,430,672 | B1 | 8/2002 | Dhong et al. |
| 6,480,845 | B1 | 11/2002 | Egolf et al. |
| 6,539,477 | B1 | 3/2003 | Seawright |
| 6,587,864 | B2 | 7/2003 | Stein et al. |
| 6,757,806 | B2 | 6/2004 | Shim |
| 6,771,196 | B2 * | 8/2004 | Hsiun ......................... 341/106 |
| 6,829,694 | B2 | 12/2004 | Stein et al. |
| 7,173,985 | B1 | 2/2007 | Diaz-Manero et al. |
| 7,187,729 | B2 | 3/2007 | Nagano |
| 7,424,597 | B2 | 9/2008 | Lee et al. |
| 2003/0085822 | A1 * | 5/2003 | Scheuermann ............... 341/67 |
| 2003/0103626 | A1 | 6/2003 | Stein et al. |
| 2003/0133568 | A1 | 7/2003 | Stein et al. |
| 2003/0149857 | A1 | 8/2003 | Stein et al. |
| 2003/0196072 | A1 | 10/2003 | Chinnakonda et al. |
| 2003/0229769 | A1 | 12/2003 | Montemayor |
| 2004/0145942 | A1 | 7/2004 | Leijten-Nowak |
| 2004/0210618 | A1 | 10/2004 | Stein et al. |
| 2005/0086452 | A1 | 4/2005 | Ross |
| 2005/0228966 | A1 | 10/2005 | Nakamura |
| 2005/0267996 | A1 | 12/2005 | O'Connor et al. |
| 2006/0143554 | A1 | 6/2006 | Sudhakar et al. |
| 2006/0271763 | A1 | 11/2006 | Pedersen et al. |
| 2007/0044008 | A1 | 2/2007 | Chen et al. |
| 2007/0089043 | A1 | 4/2007 | Chae et al. |
| 2007/0094474 | A1 | 4/2007 | Wilson et al. |
| 2007/0094483 | A1 * | 4/2007 | Wilson et al. ............... 712/220 |
| 2008/0244237 | A1 | 10/2008 | Wilson et al. |

OTHER PUBLICATIONS

"Microsoft Computer Dictionary", 2002, Microsoft Press, 5th ed., p. 474.

Citron et al. "Accelerating Multi-Media Processing by Implementing Memoing in Multiplication and Division Units," ACM Sigplan Notices, ACM, Asspociation for Computer Machinery, NY, NY, vol. 33, No. 11, Nov. 1998, pp. 252-261.

Goslin, "A Guide to Using Field Programmable Gate Arrays (FPGAs) for Application-Specific Digital Signal Processing Performance," [online], Xilinx, Dec. 1995 [retrieved Aug. 19, 2009]. Retrieved from the Internet: <http://www.xilinx.com/appnotes/dspguide.pdf>, 11 pages.

Hendrix et al., "Viterbi Decoding Techniques for the TMS32054x DSP Generation," Texas Instruments, Application Report SPRA071A-Jan. 2002, pp. 1-8.

Hennessy et al. "Computer Organization and Design: The Hardware/Software Interface" Morgan Kaufmann Publishers, Inc., 2nd ed., 1997, pp. 449-465.

Intel, Pentium Processor Family Developer's Manual, [online], vol. 3, Architecture and Programming Manual, 1995, [retrieved Dec. 7, 2009]. Retrieved from the Internet: <http://download.intel.com/design/pentium/MANUALS/24143004.pdf>, retrieved Dec. 7, 2009, 1032 pages.

Rasheed et al., "Reconfigurable Viterbi Decoder for Mobile Platform," Mobile Communications Department, Institut Eurecom Sophia Antipolis, France, 3 pages.

Richardson, "Exploiting Trivial and Redundant Computation," Computer Arithmetic, 1993, Proceedings, 11th Symposium on Windsor, Ont. Canada, Jun. 29-Jul. 2, 1983, Los Alamitos, CA, USA, IEEE Comput. Soc., Jun. 1993, pp. 220-227.

International Search Report for International Application No. PCT/US2006/040510, mailed Oct. 17, 2007, 2 pages.

Written Opinion for International Application No. PCT/US2006/040510, mailed Oct. 17, 2007, 9 pages.

Supplementary European Search Report and Opinion for European Patent Application No. 06817042.2, mailed Nov. 17, 2008, 8 pages.

English translation of Office Action for Chinese Patent Application No. 200680039988.6, mailed Jun. 19, 2009, 7 pages.

International Search Report for International Application No. PCT/US2008/010524, mailed Nov. 28, 2008, 1 page.

Written Opinion for International Application No. PCT/US2008/010524, mailed Nov. 28, 2008, 7 pages.

International Search Report for International Application No. PCT/US2006/040414, mailed Oct. 1, 2007, 1 page.

Written Opinion for International Application No. PCT/US2006/040414, mailed Oct. 1, 2007, 7 pages.

English translation of Office Action for Taiwan Patent Application No. 095139557, mailed Sep. 29, 2009, 5 pages.

Supplementary European Search Report and Opinion for European Patent Application No. 06817002.6, mailed Mar. 17, 2009, 5 pages.

International Search Report for International Application No. PCT/US2008/002914, mailed Jun. 27, 2008, 1 page.

Written Opinion for International Application No. PCT/US2008/002914, mailed Jun. 27, 2008, 4 pages.

International Search Report for International Application No. PCT/US2008/010571, mailed Nov. 25, 2008, 2 pages.

Written Opinion for International Application No. PCT/US2008/010571, mailed Nov. 25, 2008, 4 pages.

English translation of Office Action for Chinese Patent Application No. 200680039988.6, mailed Dec. 4, 2009, 4 pages.

* cited by examiner

VARIABLE LENGTH DECODER SYSTEM AND METHOD

RELATED APPLICATIONS

This application is a continuation-in-part of U.S. patent application Ser. No. 11/258,801 filed Oct. 26, 2005.

FIELD OF THE INVENTION

This invention relates to a variable length decoder system and method for simultaneously decoding one or more than one variable length code symbol.

BACKGROUND OF THE INVENTION

Compressions standards both video and audio, e.g. MPEG-4, H.263, MPEG-2, VC-1, WMV, WMA, AAC, MP3 employ with Huffman or other unambiguous code symbol schemes. For example MPEG-2 is a lossy video compression standard which enhances still-picture compression, using the Discrete Cosine Transform (DCT) and run length coding, with motion compensation. Motion compensation exploits temporal redundancy in the video stream and provides much higher compression ratios. Run length or Huffman coding, is a mapping process between source symbols and variable length code words. The variable length coder assigns shorter code words to frequently occurring source symbols, and longer for infrequently occurring symbols. This coding selects the number of bits based on known probabilities so that a data string is decoded as the bits arrive in the data stream. One of the important features of MPEG is that there are three types of frames, which are used for reducing the temporal redundancy. In the first frame type called intra (I), all the macroblocks in the frame are encoded without reference to other frames. In the second type, called predictive (P), in addition to intra macroblocks, some macroblock are encoded with motion compensation based on the previous I or P frames. In the third frame type, called bidirectional predictive (B), there are some macroblocks which are encoded with motion compensation based on either previous or succeeding I or P frames. Profiling the algorithm to determine the execution time of the different stages of the algorithm shows that VLD portion is roughly 30%. The Variable Length Decoding (VLD) is a sequential process that drives the throughput of the decoder processing pipe, the rest of the processing pipe can be parallelized. To be able to decode bigger images like 720 p or up to 1080 p the VLD process needs to be accelerated. Accelerating VLD is a challenging task because it requires sequential access to the bit stream.

BRIEF SUMMARY OF THE INVENTION

It is therefore an object of this invention to provide a new and improved much faster, variable length decoder system and method for simultaneously decoding more than one variable length code symbol.

It is a further object of this invention to provide such a new and improved much faster, variable length decoder system and method which can decode one or more, multiple, variable length coded symbols in single bit-FIFO access.

It is a further object of this invention to provide such a new and improved much faster, variable length decoder system and method which is applicable to a number of audio or video data compression algorithms e.g., MEPG-4, H.263, MPEG-2, VC-1, WMV, WMA, AAC, MP3.

It is a further object of this invention to provide such a new and improved much faster, variable length decoder system and method in which the multiple decoding is realizable with a hardware or software bit-FIFO.

It is a further object of this invention to provide such a new and improved much faster, variable length decoder system and method which can operate with any memory devices RAM of L1, L2 and L3 capability.

It is a further object of this invention to provide such a new and improved much faster, variable length decoder system and method which allows high bit rate decoding in software.

It is a further object of this invention to provide such a new and improved much faster, variable length decoder system and method which uses less power.

It is a further object of this invention to provide such a new and improved much faster, variable length decoder system and method which uses existing compute unit resources.

It is a further object of this invention to provide such a new and improved much faster, variable length decoder system and method which does not require a hardware bit-FIFO.

The invention results from the realization that a variable length decoder device for simultaneously decoding more than one variable length code symbol can be achieved by storing in a bit FIFO at least a portion of a variable length coded bit stream; defining an inspection field in the portion of a variable length coded bit stream, each inspection field identifying at least one variable length code word; storing in a look-up table a decode value uniquely addressable to each bit combination of the inspection field for reading out the one or more decode values corresponding to the unique address defined by said inspection field and may be enhanced by storing a succession of extracted bit fields of predetermined bit length from the variable length coded bit stream in the bit FIFO; defining a plurality of inspection fields in the extracted bit field, each inspection field identifying at least one variable length code symbol and selecting a number of successive inspection fields in each extracted bit filed before the next successive extracted field is stored in the data register.

The subject invention, however, in other embodiments, need not achieve all these objectives and the claims hereof should not be limited to structures or methods capable of achieving these objectives.

This invention features a variable length decoder system for simultaneously decoding one or more variable length code symbols including a bit FIFO for storing at least a portion of a variable length coded bit stream and an addressing device for defining an inspection field in the portion of a variable length coded bit stream, each inspection field identifying at least one variable length code word. There is a look-up table for storing a decode value uniquely addressable to each bit combination of the inspection field and being responsive to the addressing device for reading out the one or more decode values corresponding to the unique address defined by the inspection field.

In a preferred embodiment the addressing device may include an addressor for applying the inspection field as the unique address. The addressing device may include a data register for storing a succession of extracted bit fields of predetermined bit length from the variable length coded bit stream in the bit FIFO. The addressor may define a plurality of inspection fields in the extracted bit field; each inspection field may identify at least one variable length code symbol. The addressing device may select a number of successive inspection fields in each the extracted bit field before the next successive extracted field is stored in the data register. The look-up table may include an entry field defining the number of code words in the addressed inspection field. The look-up table may include a run field and a level field for each code word in the addressed inspection field and a shift field. The level field may contain the coefficient value, the run field the number of bits to the next non-zero bit and the shift field the count of the bits representing the code words. The code words may include symbol code words and escape code words. The escape code word may include an escape code in the entry field identifying that the code word bit count exceeds the size of the inspection field. The escape code word may include a bit number field identifying the number of additional bits needed to complete that code word and an offset field pointing to the storage address where the additional bits are located. The data register may be one of the register files of a compute unit. There may be a low water mark register for identifying when the bit FIFO must be refilled from the variable length coded bit stream. The bit FIFO may be refilled with the variable length coded bit stream from an external storage. The low water mark register may be included as a part of the bit FIFO. The low water mark register may mark the number of bits in the inspection field and may generate a low water mark signal if the bits are below that number. There may be a low water mark register for identifying when the bit FIFO must be refilled from the variable length coded bit stream. The low water mark register may mark the number of bits in the extraction field and may generate a low water mark signal if the bits are below that number.

This invention also features a variable length decoder system for simultaneously decoding one or more variable length code symbols including a bit FIFO for storing at least a portion of a variable length coded bit stream and a data register for storing a succession of extracted bit fields of predetermined bit length from the variable length coded bit stream in the bit FIFO. There is an addressing device for defining at least one inspection field in the extracted bit field, each inspection field identifying at least one variable length code symbol. A look-up table stores a decode value uniquely addressable by each bit combination of the inspection field and being responsive to the addressing device for reading out the one or more decode values corresponding to the unique address defined by the inspection field. The addressing device selects a number of successive inspection fields in each extracted bit field before the next successive extracted field is stored in the data register.

In a preferred embodiment the addressing device may include an addressor for applying the inspection field as the unique address. The look-up table may include an entry field defining the number of code words in the addressed inspection field. The look-up table may include a run field and a level field for each code word in the addressed inspection field and a shift field. The level field may contain the coefficient value, the run field the number of bits to the next non-zero bit and the shift field the count of the bits representing the code words. The code words may include symbol code words and escape code words. The escape code word may include an escape code in the entry field identifying that the code word bit count exceeds the size of the inspection field. The escape code word may include a bit number field identifying the number of additional bits needed to complete that code word and an offset field pointing to the storage address where the additional bits are located. The data register may be one of the register files of a compute unit. There may be a low water mark register for identifying when the bit FIFO must be refilled from the variable length coded bit stream. The bit FIFO may be refilled with the variable length coded bit stream from an external storage. The low water mark register may be included as a part of the bit FIFO. The low water mark register may mark the number of bits in the extraction field and may generate a low water mark signal if the bits are below that number.

This invention also features a variable length decoder method for simultaneously decoding one or more variable length code symbols including storing in a bit FIFO at least a portion of a variable length coded bit stream and defining an inspection field in the portion of a variable length coded bit stream. Each inspection field identifies at least one variable length code word. The method further includes storing in a look-up table a decode value uniquely addressable to each bit combination of the inspection field for reading out the one or more decode values corresponding to the unique address defined by the inspection field.

In a preferred embodiment the method may include applying the inspection field as the address. The method may include storing a succession of extracted bit fields of predetermined bit length from the variable length coded bit stream; defining a plurality of inspection fields in the extracted bit field, each inspection field identifying at least one variable length code symbol and selecting a number of successive inspection fields in each extracted bit field before the next successive extracted field is stored in the data register. The look-up table may include an entry field defining the number of code words in the addressed inspection field. The look-up table may include a run field and a level field for each code word in the addressed inspection field and a shift field. The level field may contain the coefficient value, the run field the number of bits to the next non-zero bit and the shift field the count of the bits representing the code words. The code words may include symbol code words and escape code words. The escape code word may include an escape code in the entry field identifying that the code word bit count exceeds the size of the inspection field. The escape code word may include a bit number field identifying the number of additional bits needed to complete that code word and an offset field pointing to the storage address where the additional bits are located.

This invention also features a variable length decoder method for simultaneously decoding one or more variable length code symbols including storing in a bit FIFO at least a portion of a variable length coded bit stream; storing a succession of extracted bit fields of predetermined bit length from the variable length coded bit stream in the bit FIFO and defining at least one inspection field in the extracted bit field. Each inspection field may identify at least one variable length code symbol. The method includes storing in a look-up table a decode value uniquely addressable by each bit combination of the inspection field for reading out the one or more decode values corresponding to the unique address defined by the inspection field and selecting a number of successive inspection fields in each extracted bit field before the next successive extracted field is stored.

In a preferred embodiment the method may include applying the inspection field as the address. The look-up table may include an entry field defining the number of code words in the addressed inspection field. The look-up table may include a run field and a level field for each code word in the addressed inspection field and a shift field. The level field may contain the coefficient value, the run field the number of bits to the next non-zero bit and the shift field the count of the bits representing the code words. The code words may include symbol code words and escape code words. The escape code word may include an escape code in the entry field identifying that the code word bit count exceeds the size of the inspection field. The escape code word may include a bit number field identifying the number of additional bits needed to complete that code word and an offset field pointing to the storage address where the additional bits are located.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
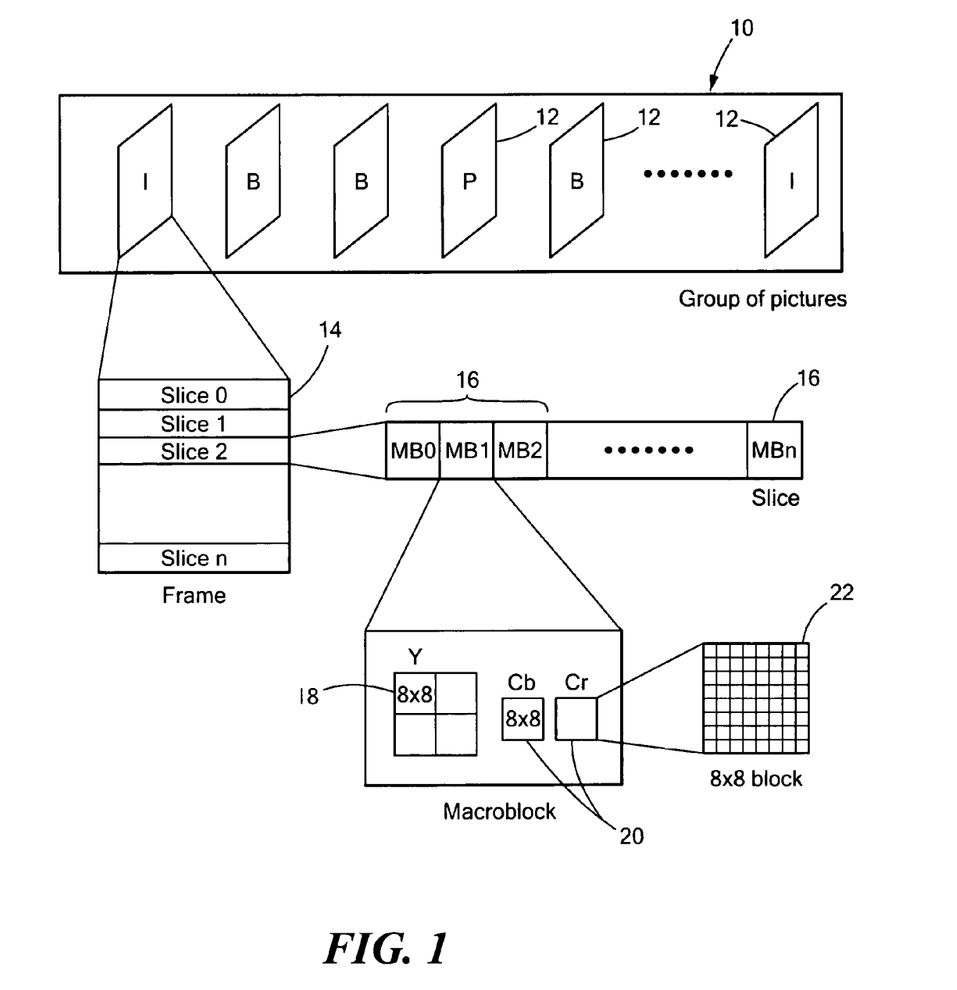
FIG. 1 is a schematic block diagram showing the form of a typical bit stream.

There is shown in FIG. 1 a typical bit stream 10 composed of a group of pictures or frames 12 which may be either intra, I, bi-directional predictive, B, or predictive, P. An intra frame, I, is decoded without reference to any other frame. A bi-directional predictive frame, B, is decoded with reference to frames both previous and forward in time and a predictive frame, P, is decoded with reference to a previous frame. Each frame of whatever kind, I, B, or P is composed of group of slices 14. Each slice includes a number of macro blocks 16. Each macro block includes four blocks 18 of luma and two blocks 20 of chroma. Each block is an 8 by 8 64 bit array 22.

Figure 2:
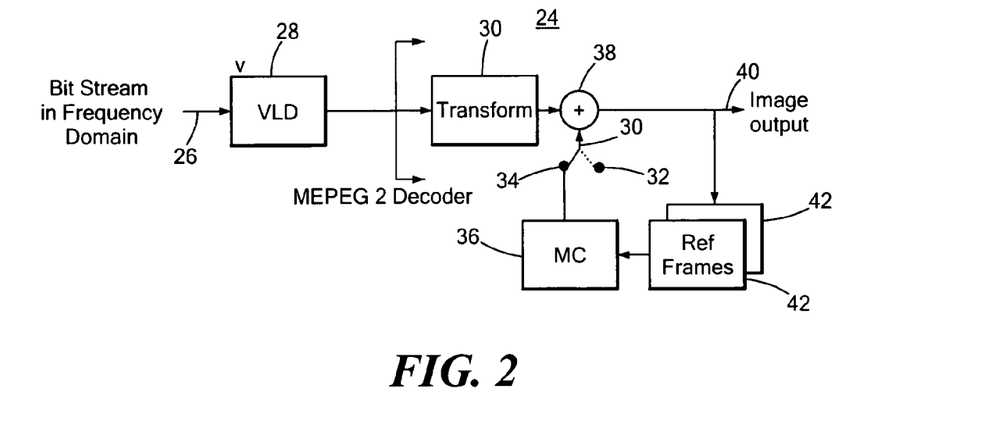
FIG. 2 is a schematic block diagram of a typical variable length decoder (VLD)

In a typical decoder 24, FIG. 2, such as an MPEG-2 decoder the bit stream 26 is delivered in the frequency domain to the variable length decoder 28 whose output is the quantized DCT coefficients are reconstructed and inverse transformed in circuit 30 which transforms the bit stream from the frequency domain to the time domain. If the bit stream 26 input frame was an intra frame, I, switch 30 will be swung to the open position 32. If it is a bidirectional, B, or predictive, P, it will be swung to the closed position 34 connecting the motion compensation prediction circuit 36 to summing circuit 38 for adding the prediction error (DCT residuals) with the motion compensation prediction. Thus, in the first position 32 the intra frame is fed directly to the image output at 40. In the closed position at 34 motion compensation prediction refers back to a previous frame for a predicted, P, frame or to both a future and past frame 42 if the incoming frame is a bidirectional B frame.

Figure 3:
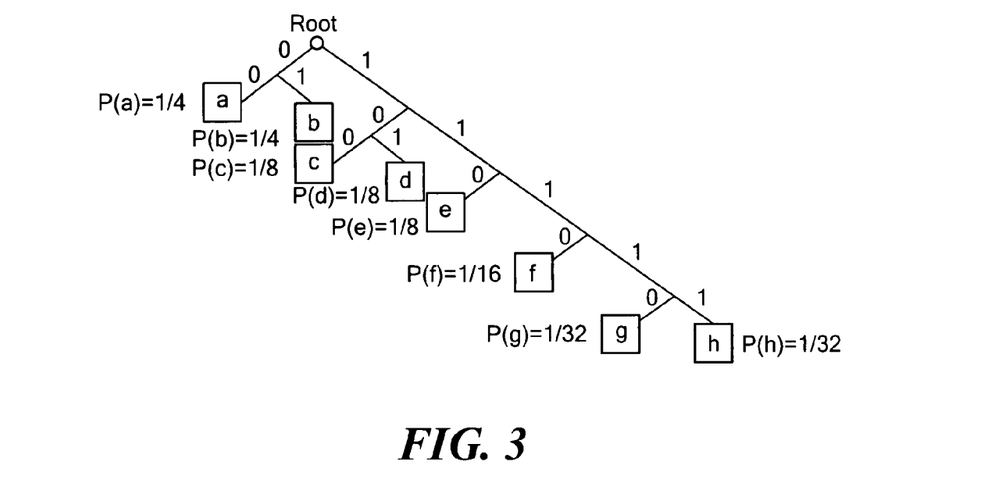
FIG. 3 is a chart illustrating VLD values for symbols a, b, c . . .

Variable Length Code (VLC) takes advantage of the fact that certain code values are going to occur more often then others. If frequently occurring values are assigned short length code words and infrequently ones transmitted using longer code words an effective bit rate reduction will be obtained. As an analogy, if English text was being transmitted "a", "e", "i" would be sent with short code words whereas "z" would be sent using a long code word. For example, a, b, c, d, e, f . . . are coded with variable length keys as shown by the graphic depiction in FIG. 3. The symbol a is represented by 0, the symbol b by 0 1, the symbol c by 1 0 0, the symbol d by 1 0 1, the symbol e by 1 1 0, the symbol f by 1 1 1 0, symbol g by 1 1 1 1 0 and so on.

Each VLC code word donates a run of zeros by a non-zero coefficient of particular level. VLC coding recognizes that short run of zeros are more likely than long ones and small coefficients are more likely than large ones. The VLC allocates code words which have different lengths depending upon the probability with which they are expected to occur. To enable the decoder to distinguish where one code ends and the next begins, the VLC has the property that no complete code is a prefix of any other.

To illustrate the variable-length coding process, consider the following example list of values produced by scanning the quantized coefficients from the transform block:

12, 6, 6, 0, 4, 3, 0, 0, 0, . . . 0

The first step is to group the values into runs of zeros followed by non-zero value.

The final run of zeros is replaced with an End of Block (EOB) marker. The first step gives:

(12), (6), (6), (0, 4), (3), EOB

The second step is to generate the VLC code words corresponding to each group and the EOB marker. Using the MPEG2 VLC coefficient table B14

| Length of Run of zeros | value of non-zero coefficient | variable-length codeword |
|---|---|---|
| 0 | 12 | 0000 0000 1101 00 |
| 0 | 6 | 0010 0001 0 |
| 1 | 4 | 0000 0011 000 |
| 0 | 3 | 0010 10 |
| EOB | — | 10 |

And the final coded representation of the example clock is:
0000 0000 1101 00, 0010 0001 0, 0010 0001 0, 0000 0011 000, 0010 10, 10.

Figure 4:
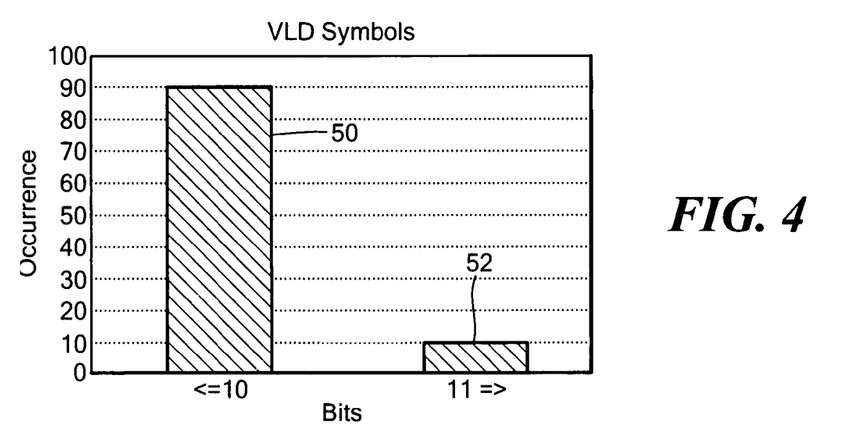
FIG. 4 is a chart illustrating the occurrence of VLD symbols in 10 or fewer bits.
Figure 5:
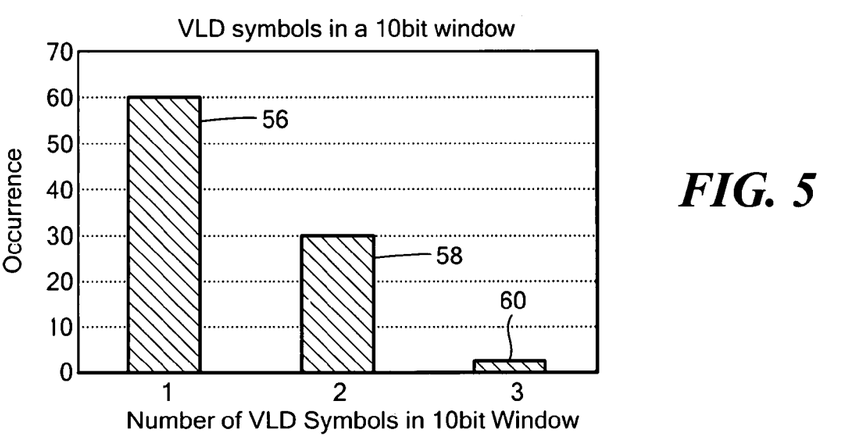
FIG. 5 is a chart illustrating the number of VLD symbols in a 10 bit window.
Figure 6:
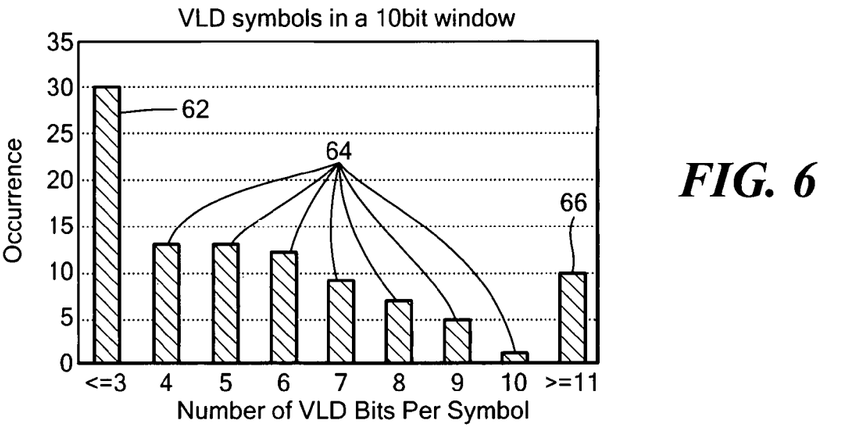
FIG. 6 is a chart illustrating the number of bits per VLD symbol.

This invention occurs from an appreciation of the distribution of variable length decoding symbols in a typical video clip. To begin with an analysis of a video clip showed that approximately 90% of the variable length decoding symbols were composed of 10 bits or fewer, approximately, as indicated at 50, FIG. 4. Approximately 10% or less were composed of 11 bits or more 52. Further analysis showed that in the 90% of the variable length decoding (VLD) symbols of 10 bits or less 60% of those contained but a single symbol in those 10 or fewer bits 56, FIG. 5. Another approximately 30% 58 contained two symbols in the 10 or fewer bits. Approximately 3% 60 had three symbols in 10 or fewer bits. Further contemplation showed that the most common occurrence was that there were three VLD symbols or fewer 62, FIG. 6, in a ten bit field. The number of VLD bits per symbol decreased from four through 10 shown at 64 and only 10% required 11 or more bits 66.

Figure 7:
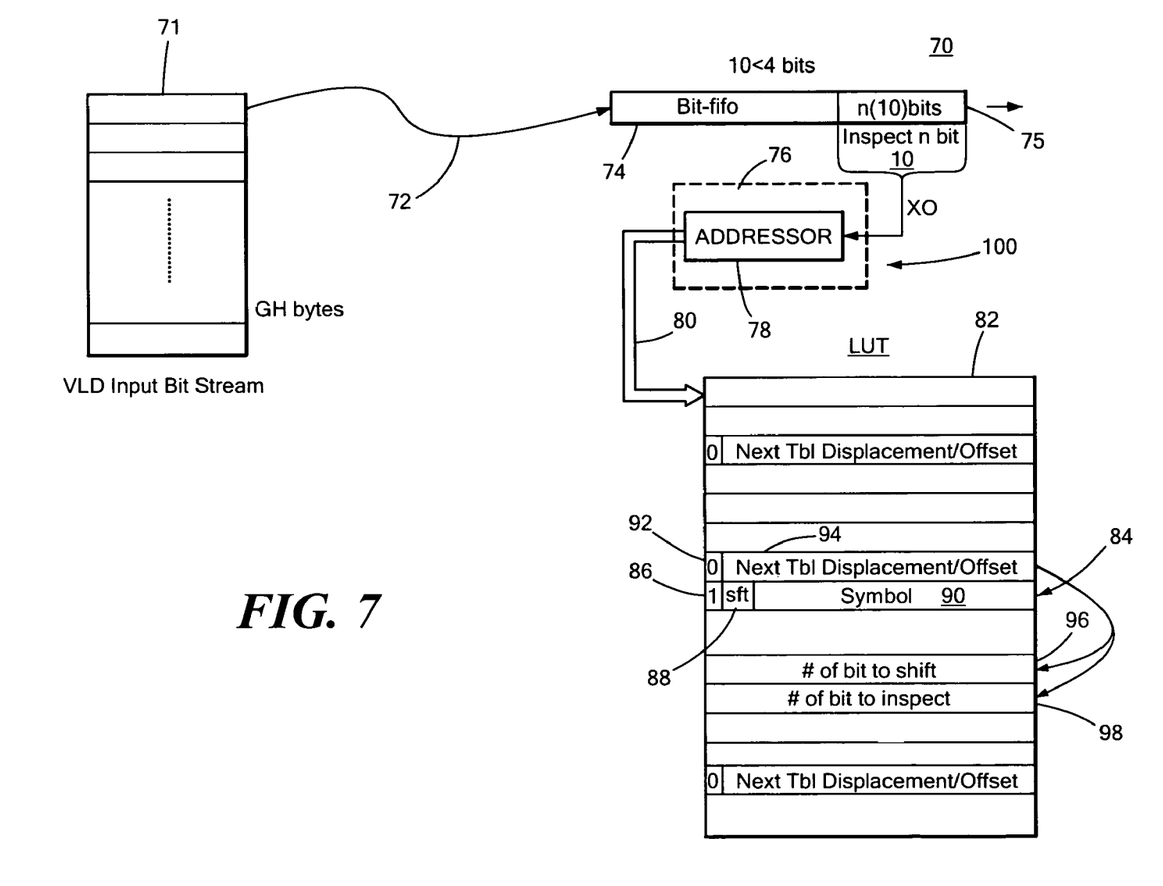
FIG. 7 is a schematic block diagram of a VLD system according to this invention.

A variable length decoder system 70, FIG. 7, for decoding a single variable length code symbol is shown. The VLD input bit stream 72 from an external memory such as an L3 type containing many gigabytes of data is delivered to bit FIFO 74. Addressing device 76 including an addresser 78 inspects an n bit section 75 of the bit FIFO, in this case, for example n=10 and addresser 78 uses those n bits as an address over line 80 to address look-up table 82. If the address points to a location such as 84 where a symbol is contained within the 10 bits there will be a 1 in field 86 indicating that this is the case. This is followed by a shift or count field 88 which indicates the number of bits to shift out (or to be read) from the bit FIFO to get to the beginning of the next VLD symbol. If on the other hand the address is to a location where the VLD is greater than 10 bits there will be a 0 field 92 followed by the address of the next table displacement 94 or offset which leads to other locations in the lookup table that contain the number of bits to shift out form the FIFO 96 and the number of additional bits to inspect 98 to obtain the full VLD symbol represented by more than 10 bits.

Figure 8:
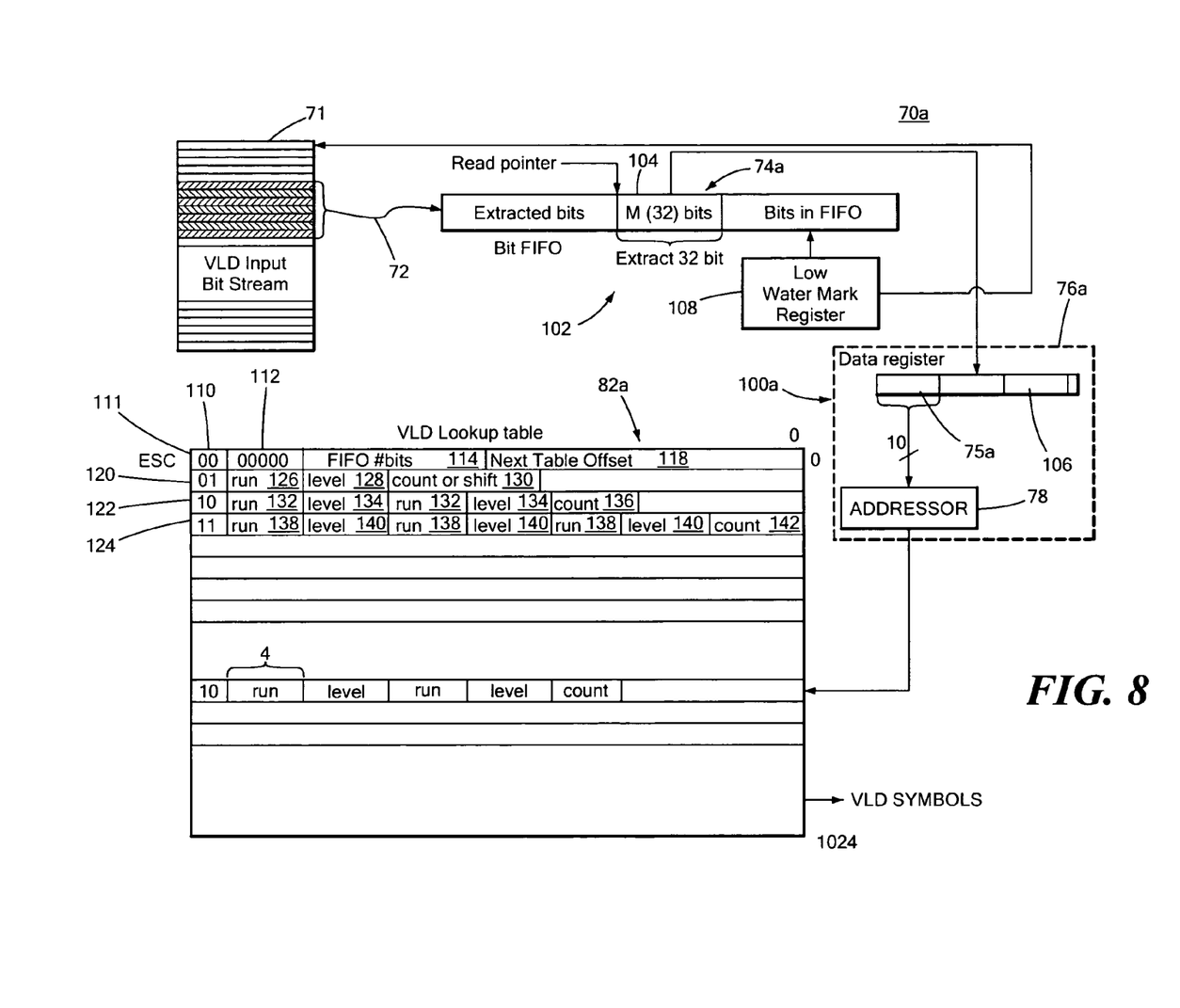
FIG. 8 is a schematic block diagram similar to FIG. 7 with an outer as well as inner loop and the LUT shown in greater detail.

Thus, a variable length decoder 70*a*, FIG. 8, for simultaneously decoding one or more variable length symbols was realized. For purposes of simplifying the next explanation the assembly of the addressing device 76 with addresser 78 that uses the inspection bits 75 as an address on line 80 to address locations in look-up table 82 is referred to as the inner-loop 100, FIG. 7. A second outer loop, 102, FIG. 8, can be employed as well according to this invention. In FIG. 8 and following figures like parts are referenced by like numbers and similar parts by like numbers accompanied by a lower case letter. In system 70*a*, FIG. 8, external memory 71 provides a bit stream 72 to bit FIFO 74*a*. In the outer loop some number of bits m, in this case 32 is extracted at 104 from the bit stream in bit FIFO 74*a*. These m or for example 32 bits are stored in data register 106 employing again an inspection field where n=10. Data register 106 having extracted 32 bits includes three fields of 10 bits each plus and additional two bits. Now as previously the inspection field 75*a* is used by addresser 78 to address locations in look-up table 82*a*. There is now the additional advantage of the speed gained by having the extracted bits ready in data register 106. A low water mark register 108 is also employed to indicate when the bits in the FIFO reach a number less than n, e.g. 10. When that occurs additional bits are delivered from bit stream 72. Register 76, 76*a*, 78, 106, 108 and other registers may be conveniently implemented using the registers of the register files of the compute unit.

Look-up table 82, FIG. 8, shows in detail the information stored there. Each location includes an entry code in column 110; it may, as at location 111, be an escape code 00 or a code for one code word being present 01, two code words being present 10, three code words being present 11 . . . . When there is an escape code (00) there is contained a field 112 which indicates the number of bits to shift, the field 114 which indicates the number of bits needed and the next table offset or displacement field 118, as explained with respect to the discussion in FIG. 7. For locations in which one or more code words are present in their entirety such as locations 120, 122, 124 there is a run field and a level field for each code word plus a count or shift field to mark the number of bits needed to be read from the FIFO to skip over the multiple VLD symbols and to get to the beginning for the next inspection field. The run field indicates the number of zeros to the next non-zero level. The level indicates a level and the count indicates the number of bits in the VLD symbol. In location 120 where there is one code word represented by the zero one in entry field 110 there is one run field 126, one level field 128, and a count or shift field 130. In location 122 where there are two code words there will be two runs fields 132, two level fields 134 and a count field 136 and in location 124 where there are three code words there will be three run fields 138, three level fields 140, and a count or shift field 142.

Figure 9:
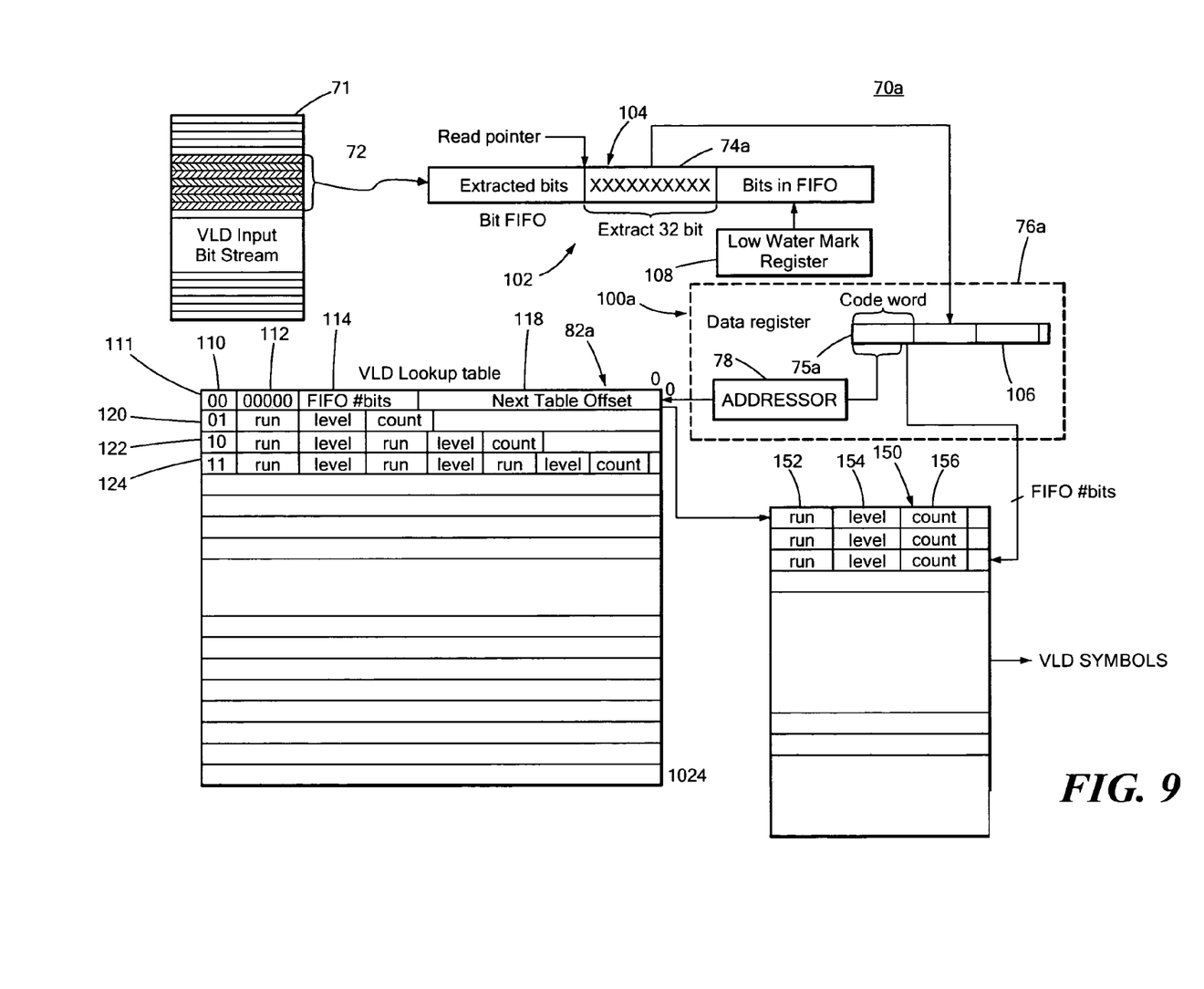
FIG. 9 is a schematic block diagram similar to FIG. 8 showing an additional table for VLD symbols of greater than 10 bits.

When a location such as location 111 contains the escape code 00, FIG. 9, field 114 contains FIFO number of bits which indicates how many more bits are needed to define the symbol which is made up of more than 10 bits. Field 118 which contains the offset or displacement to an address in another table 150 where the additional run 152, level 154, and count 156 data is contained.

Figure 10:
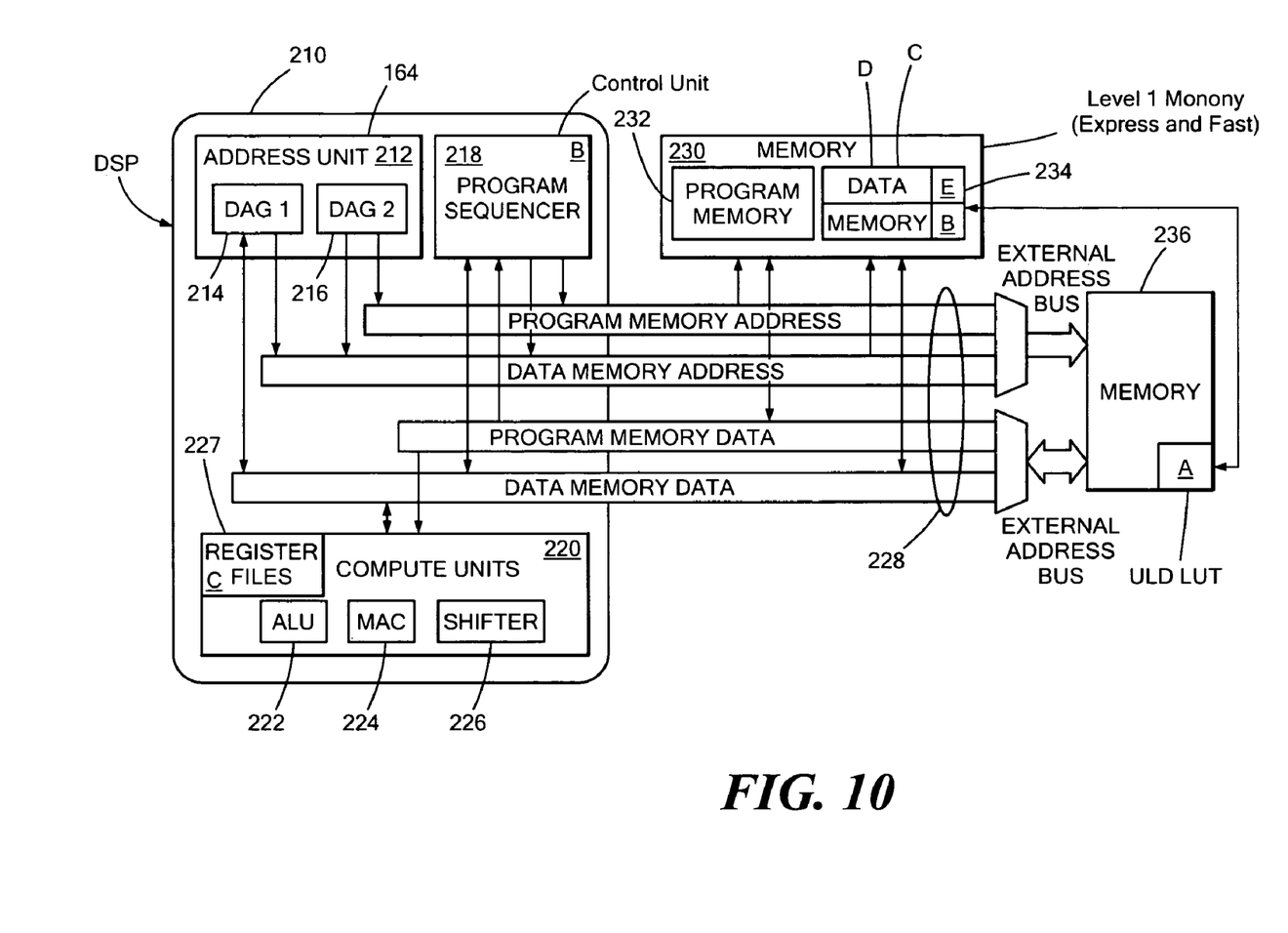
FIG. 10 is a schematic block diagram of a DSP compute unit which can be used to implement this invention.

One of the advantages of the invention is that it can be carried out with an existing compute unit such as compute unit 220, FIG. 10, in digital signal processor (DSP) 210. A digital signal processor 210 includes an address unit 212 having one or more digital address generators 214, 216. A control unit, such as program sequencer 218 and one or more compute units 220, each of which contains a number of circuits such as arithmetic logic unit 222, multiply/accumulator 224, shifter 226 and data register 227. Typically there are two, four or many more compute units in a digital signal processor. The digital signal processor is connected over memory buses 228 to one or more memories such as level one (L1) memory 230, including program memory 232 and data memory 234 or additional memory 236. Memory 230 may be a level one memory which is typically very fast and quite expensive. Memory 236 may be a level three (L3) memory which is less expensive and slower. With DSP 210 operating at 1 GHz and beyond, the cycles of operations are so fast that the address unit and the compute units require more than one cycle to complete their operations. To improve DSP 10 throughput and enhance its performance, it is typically deeply pipelined.

Figure 11:
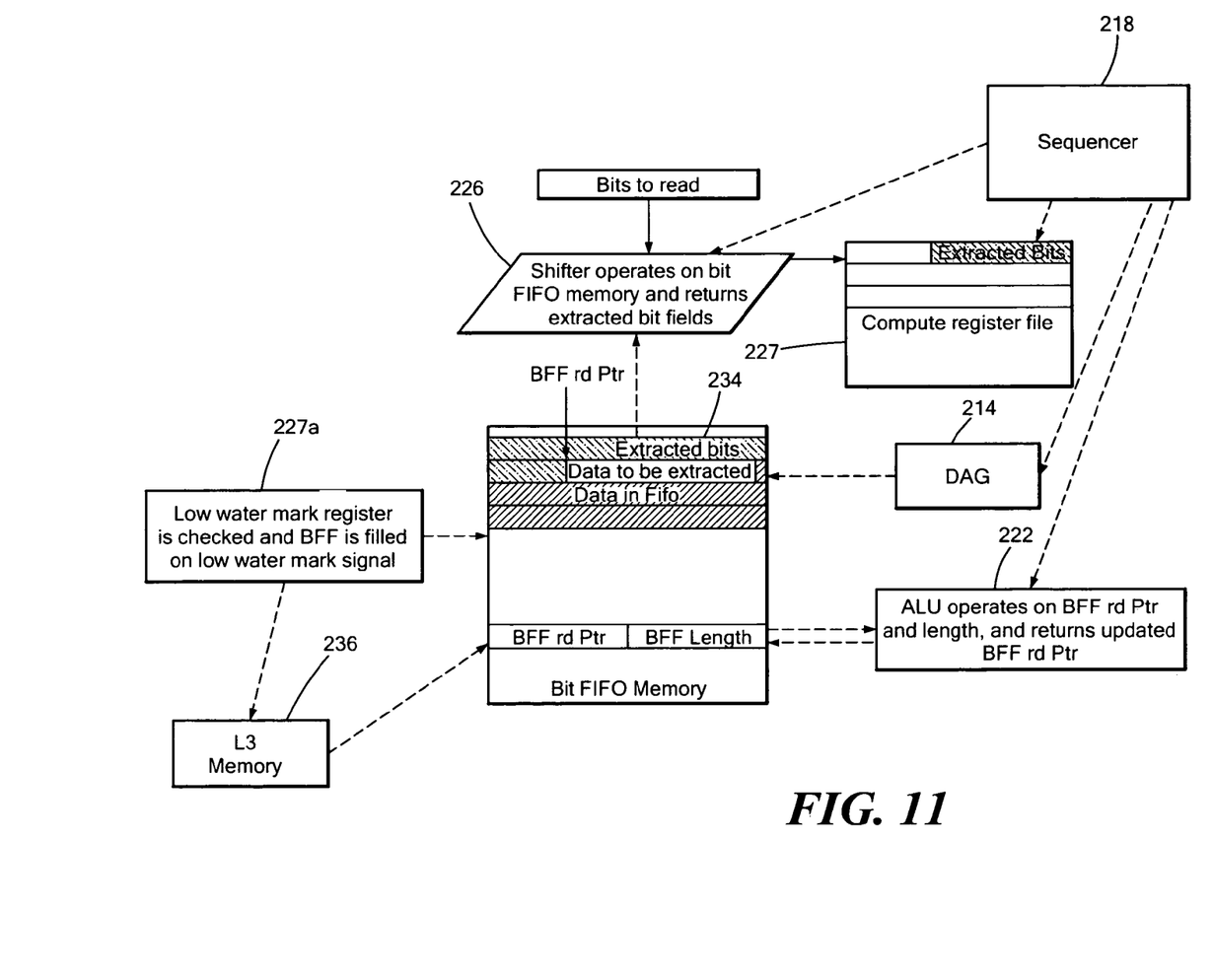
FIG. 11 is schematic block diagram of a software bit-FIFO that can be implemented using the DSP compute unit of FIG. 10.

The bit FIFO in FIGS. 7, 8 and 9 may be implemented in software as shown in FIG. 11, using the existing components of compute unit 210, FIG. 10, where like parts have been given like numbers with respect to FIG. 10. The low water mark register 227*a* actually can be implemented in compute register file 227 and bit FIFO memory is implemented using data memory 234.

Figure 12:
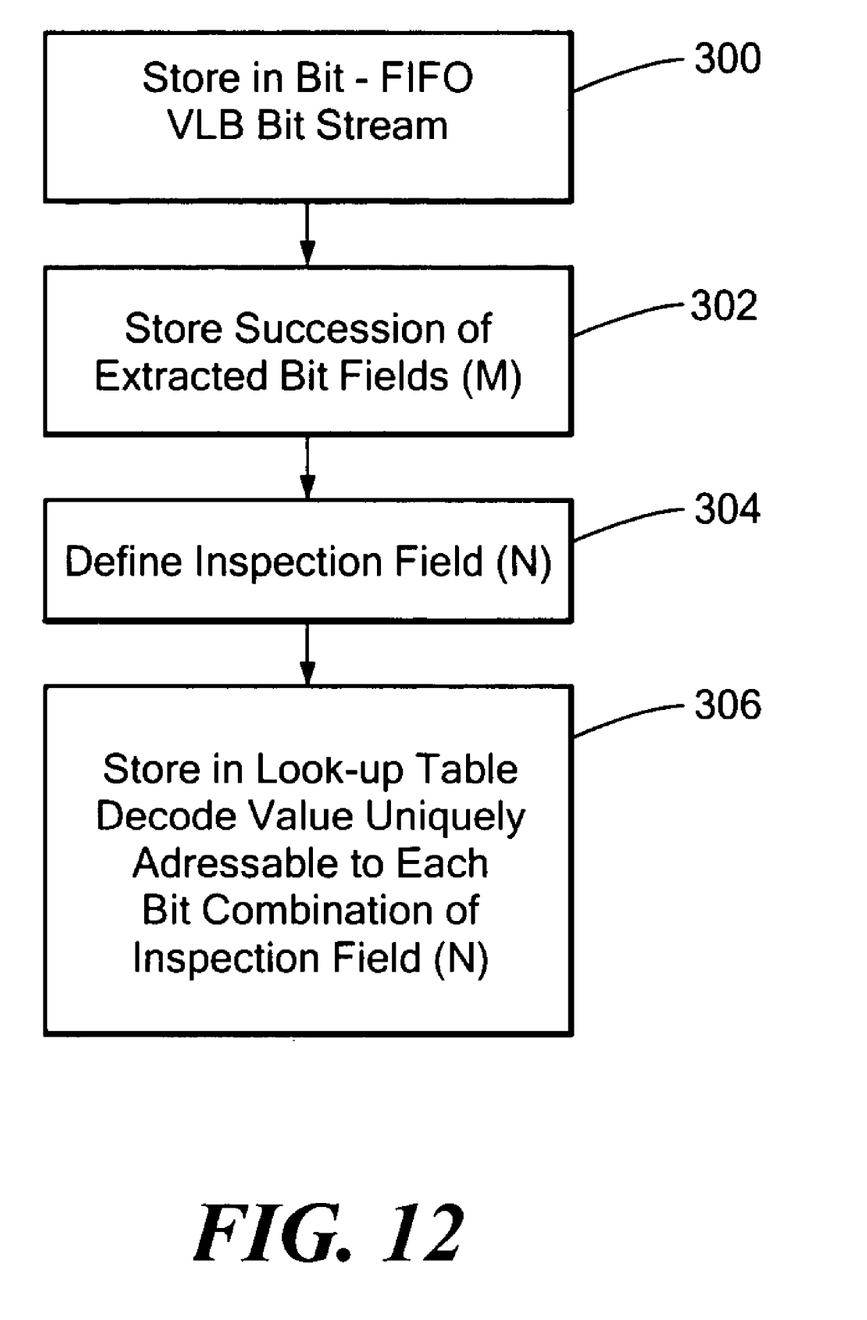
FIG. 12 is a flow chart of the method according to this invention.

The method of this invention includes the simultaneous decoding of one of more variable length code symbols including storing in a bit FIFO at least a portion of a variable length coded bit stream 300, FIG. 12. A succession of extracted bit fields of predetermined bit length from the variable length coded bit stream in the bit FIFO are stored 302. An inspection field is defined 304 in the portion of the variable length coded bit stream or the extracted bit field. Each inspection field identifies at least one variable length code word or symbol. In a look-up table there is stored 306 a decode value uniquely addressable to each bit combination of the inspection field which reads out the one or more decode values corresponding to the unique address defined by the inspection field. A number of successive inspection fields in each extracted bit field is selected before the next successive extracted field is stored in the data register. The inspection field is applied as a unique address. The look up table includes an entry field defining the number of code words in the addressed inspection field. There is a run field and a level field for each code word in the addressed inspection field and a shift field. The level field contains the coefficient value, the run field contains the number of bits to the next non-zero bit and the shift field contains the count of the bits representing the code words. The code words include symbol code words and escape code words. The escape code words include an escape code in the entry field identifying that the code word bit count exceeds the size of the inspection field. The escape code word includes a bit number field identifying the number of additional bits needed to complete that code word and an offset field pointing to the storage address where the additional bits are located. Although in this example the extraction field m is explained as 32 bits m can be any convenient number. Likewise although the inspection field of n size has been explained with reference to n=10, this, too, is not a limitation of the invention.

For the convenience of the reader a standard Table B-14—Discrete Cosine Transfer Coefficients table is shown giving the standard run and level values for the different variable length codes.

TABLE B-14

ISO/1EC 13818-2: 1995 (E)
DCT coefficients Table zero

| Variable length code (NOTE1) | run | level |
|---|---|---|
| 10 (NOTE 2) | End of Block | |
| 1s (NOTE 3) | 0 | 1 |
| 11 s (NOTE 4) | 0 | 1 |
| 011 s | 1 | 1 |
| 0100s | 0 | 2 |
| 0101 s | 2 | 1 |
| 0010 1 s | 0 | 3 |
| 0011 1 s | 3 | 1 |
| 0011 0s | 4 | 1 |
| 0001 10s | 1 | 2 |
| 0001 11s | 5 | 1 |
| 0001 01 s | 6 | 1 |
| 0001 00 s | 7 | 1 |
| 0000 110 s | 0 | 4 |
| 0000100 s | 2 | 2 |
| 0000 111 s | 8 | 1 |
| 0000 101 s | 9 | 1 |
| 0000 01 | Escape | |
| 00100110 s | 0 | 5 |
| 0010 0001 s | 0 | 6 |
| 0010 0101 s | 1 | 3 |
| 0010 0100 s | 3 | 2 |
| 0010 0111 s | 10 | 1 |
| 0010 0011 s | 11 | 1 |
| 0010 0010 s | 12 | 1 |
| 0010 0000 s | 13 | 1 |
| 0000 0010 10 s | 0 | 7 |
| 0000 0011 00 s | 1 | 4 |
| 0000 0010 11 s | 2 | 3 |

TABLE B-14-continued

ISO/1EC 13818-2: 1995 (E)
DCT coefficients Table zero

| | | |
|---|---|---|
| 0000 0011 11 s | 4 | 2 |
| 0000001001s | 5 | 2 |
| 0000 0011 10 s | 14 | 1 |
| 0000 0011 01 s | 15 | 1 |
| 0000 0010 00 s | 16 | 1 |

NOTE 1 - The last bit's' denotes the sign of the level,
'0' for positive '1' for negative.
NOTE 2 - "End of Block" shall not be the only code of the block.
NOTE 3 - This code shall be used for the first (DC) coefficient in the block
NOTE 4 - This code shall be used for all other coefficients
162 Recommendation ITU-T H.262 (1995 E)

| Variable length code (NOTE) | run | level |
|---|---|---|
| 0000 0001 1101 s | 0 | 8 |
| 0000 0001 1000 s | 0 | 9 |
| 0000 0001 0011 s | 0 | 10 |
| 0000 0001 0000 s | 0 | 11 |
| 0000 0001 1011 s | 1 | 5 |
| 0000 0001 0100 s | 2 | 4 |
| 0000 0001 1100 s | 3 | 3 |
| 0000 0001 0010 s | 4 | 3 |
| 0000 0001 1110 s | 6 | 2 |
| 0000 0001 0101 s | 7 | 2 |
| 0000 0001 0001 s | 8 | 2 |
| 0000 0001 1111 s | 17 | 1 |
| 0000 0001 1010 s | 18 | 1 |
| 0000 0001 1001 s | 19 | 1 |
| 0000 0001 0111 s | 20 | 1 |
| 0000 0001 0110 s | 21 | 1 |
| 0000 0000 1101 0 s | 0 | 12 |
| 0000 0000 1100 1 s | 0 | 13 |
| 0000 0000 1100 0 s | 0 | 14 |
| 0000 0000 1011 1 s | 0 | 15 |
| 0000 0000 1011 0 s | 1 | 6 |
| 0000 0000 1010 1 s | 1 | 7 |
| 0000 0000 1010 0 s | 2 | 5 |
| 0000 0000 1001 1 s | 3 | 4 |
| 0000 0000 1001 0 s | 5 | 3 |
| 0000 0000 1000 1 s | 9 | 2 |
| 0000 0000 1000 0 s | 10 | 2 |
| 0000 0000 1111 1 s | 22 | 1 |
| 0000 0000 1111 0 s | 23 | 1 |
| 0000 0000 1110 1 s | 24 | 1 |
| 0000 0000 1110 0 s | 25 | 1 |
| 0000 0000 1101 1 s | 26 | 1 |

NOTE - The last bit 's' denotes the sign of the level,
'0' for positive, '1' for negative.
Recommendation ITU-T H.262 (1995 E) 163

Also shown is a copy of the first page and the ninth page of a print out of the VLD codes in the left hand column and the look-up table entries in the right hand column.

| VLD Code | | Table Entry | |
|---|---|---|---|
| Hex | 10 bit | Hex | Binary |
| 00000000 | 0000000000 | | xxxxxxxxxxxxxxxxxxxxxxxxxxxxxxxx |
| 00000001 | 0000000001 | | xxxxxxxxxxxxxxxxxxxxxxxxxxxxxxxx |
| 00000002 | 0000000010 | | xxxxxxxxxxxxxxxxxxxxxxxxxxxxxxxx |
| 00000003 | 0000000011 | | xxxxxxxxxxxxxxxxxxxxxxxxxxxxxxxx |
| 00000004 | 0000000100 | | xxxxxxxxxxxxxxxxxxxxxxxxxxxxxxxx |
| 00000005 | 0000000101 | | xxxxxxxxxxxxxxxxxxxxxxxxxxxxxxxx |
| 00000006 | 0000000110 | | xxxxxxxxxxxxxxxxxxxxxxxxxxxxxxxx |
| 00000007 | 0000000111 | | xxxxxxxxxxxxxxxxxxxxxxxxxxxxxxxx |
| 00000008 | 0000001000 | | xxxxxxxxxxxxxxxxxxxxxxxxxxxxxxxx |

-continued

| VLD Code | | Table Entry | |
|---|---|---|---|
| Hex | 10 bit | Hex | Binary |
| 00000009 | 0000001001 | | xxxxxxxxxxxxxxxxxxxxxxxxxxxxxxxx |
| 0000000a | 0000001010 | | xxxxxxxxxxxxxxxxxxxxxxxxxxxxxxxx |
| 0000000b | 0000001011 | | xxxxxxxxxxxxxxxxxxxxxxxxxxxxxxxx |
| 0000000c | 0000001100 | | xxxxxxxxxxxxxxxxxxxxxxxxxxxxxxxx |
| 0000000d | 0000001101 | | xxxxxxxxxxxxxxxxxxxxxxxxxxxxxxxx |
| 0000000e | 0000001110 | | xxxxxxxxxxxxxxxxxxxxxxxxxxxxxxxx |
| 0000000f | 0000001111 | | xxxxxxxxxxxxxxxxxxxxxxxxxxxxxxxx |
| 00000010 | 0000010000 | | xxxxxxxxxxxxxxxxxxxxxxxxxxxxxxxx |
| 00000011 | 0000010001 | | xxxxxxxxxxxxxxxxxxxxxxxxxxxxxxxx |
| 00000012 | 0000010010 | | xxxxxxxxxxxxxxxxxxxxxxxxxxxxxxxx |
| 00000013 | 0000010011 | | xxxxxxxxxxxxxxxxxxxxxxxxxxxxxxxx |
| 00000014 | 0000010100 | | xxxxxxxxxxxxxxxxxxxxxxxxxxxxxxxx |
| 00000015 | 0000010101 | | xxxxxxxxxxxxxxxxxxxxxxxxxxxxxxxx |
| 00000016 | 0000010110 | | xxxxxxxxxxxxxxxxxxxxxxxxxxxxxxxx |
| 00000017 | 0000010111 | | xxxxxxxxxxxxxxxxxxxxxxxxxxxxxxxx |
| 00000018 | 0000011000 | | xxxxxxxxxxxxxxxxxxxxxxxxxxxxxxxx |
| 00000019 | 0000011001 | | xxxxxxxxxxxxxxxxxxxxxxxxxxxxxxxx |
| 0000001a | 0000011010 | | xxxxxxxxxxxxxxxxxxxxxxxxxxxxxxxx |
| 0000001b | 0000011011| | xxxxxxxxxxxxxxxxxxxxxxxxxxxxxxxx |
| 0000001c | 0000011100 | | xxxxxxxxxxxxxxxxxxxxxxxxxxxxxxxx |
| 0000001d | 0000011101 | | xxxxxxxxxxxxxxxxxxxxxxxxxxxxxxxx |
| 0000001e | 0000011110 | | xxxxxxxxxxxxxxxxxxxxxxxxxxxxxxxx |
| 0000001f | 0000011111 | | xxxxxxxxxxxxxxxxxxxxxxxxxxxxxxxx |
| 00000020 | 0000100000 | 48500000 | |01|0010|00010|1000| |
| 00000021 | 0000100001 | 48500000 | |01|0010|00010|1000| |
| 00000022 | 0000100010 | 88400a00 | |10|0010|00000|0000|00000|1010| |
| 00000023 | 0000100011 | 48500000 | |01|0010|00010|1000| |
| 00000024 | 0000100100 | 4bd00000 | |01|0010|11110|1000| |
| 00000025 | 0000100101 | 4bd00000 | |01|0010|11110|1000| |
| 00000026 | 0000100110 | 8bc00a00 | |10|0010|11110|0000|00000|1010| |
| 00000027 | 0000100111 | 4bd00000 | |01|0010|11110|1000| |
| 00000028 | 0000101000 | 64300000 | |01|1100|10000|1000| |
| 00000029 | 0000101001 | 64300000 | |01|1001|00001|1000| |
| | | | Page 1 |
| 000001c5 | 0111000101 | 47e80000 | |01|0001|11111|0100| |
| 000001c6 | 0111000110 | 47e80000 | |01|0001|11111|0100| |
| 000001c7 | 0111000111 | 47e80000 | |01|0001|11111|0100| |
| 000001c8 | 0111001000 | 47e80000 | |01|0001|11111|0100| |
| 000001c9 | 0111001001 | 47e80000 | |01|0001|11111|0100| |
| 000001ca | 0111001010 | 87e03a00 | |10|0001|11111|0000|00011|1010| |
| 000001cb | 0111001011 | 87e1da00 | |10|0001|11111|0000|11101|1010| |
| 000001cc | 0111001100 | 87e81a00 | |10|0001|11111|0100|00001|1010| |
| 000001cd | 0111001101 | 87e9fa00 | |10|0001|11111|0100|11111|1010| |
| 000001ce | 0111001110 | 87e61a00 | |10|0001|11111|0011|00001|1010| |
| 000001cf | 0111001111 | 87e7fa00 | |10|0001|11111|0011|11111|1010| |
| 000001d0 | 0111010000 | 87e02900 | |10|0001|11111|0000|00010|1001| |
| 000001d1 | 0111010001 | 87e02900 | |10|0001|11111|0000|00010|1001| |
| 000001d2 | 0111010010 | 87e1e900 | |10|0001|11111|0000|11110|1001| |
| 000001d3 | 0111010011 | 87e1e900 | |10|0001|11111|0000|11110|1001| |
| 000001d4 | 0111010100 | 87e41900 | |10|0001|11111|0010|00001|1001| |
| 000001d5 | 0111010101 | 87e41900 | |10|0001|11111|0010|00001|1001| |
| 000001d6 | 0111010110 | 87e5f900 | |10|0001|11111|0010|11111|1001| |
| 000001d7 | 0111010111 | 87e5f900 | |10|0001|11111|0010|11111|1001| |
| 000001d8 | 0111011000 | 87e21800 | |10|0001|11111|0001|00001|1000| |
| 000001d9 | 0111011001 | 87e21800 | |10|0001|11111|0001|00001|1000| |
| 000001da | 0111011010 | c7c44028 | |11|0001|11111|0001|0001|0000|0000|1010| |
| 000001db | 0111011011 | 87e21800 | |10|0001|11111|0001|00001|1000| |
| 000001dc | 0111011100 | 87e3f800 | |10|0001|11111|0001|11111|1000| |
| 000001dd | 0111011101 | 87e3f800 | |10|0001|11111|0001|11111|1000| |
| 000001de | 0111011110 | c7c7c028 | |11|0001|11111|0001|1111|0000|0000|1010| |
| 000001df | 0111011111 | 87e3f800 | |10|0001|11111|0001|11111|1000| |
| 000001e0 | 0111100000 | 87e00600 | |10|0001|11111|0000|00000|0110| |
| 000001e1 | 0111100001 | 87e00600 | |10|0001|11111|0000|00000|0110| |
| 000001e2 | 0111100010 | 87e00600 | |10|0001|11111|0000|00000|0110| |
| 000001e3 | 0111100011 | 87e00600 | |10|0001|11111|0000|00000|0110| |
| 000001e4 | 0111100100 | 87e00600 | |10|0001|11111|0000|00000|0110| |
| 000001e5 | 0111100101 | 87e00600 | |10|0001|11111|0000|00000|0110| |
| 000001e6 | 0111100110 | 87e00600 | |10|0001|11111|0000|00000|0110| |
| 000001e7 | 0111100111 | 87e00600 | |10|0001|11111|0000|00000|0110| |
| 000001e8 | 0111101000 | 87e00600 | |10|0001|11111|0000|00000|0110| |
| 000001e9 | 0111101001 | 87e00600 | |10|0001|11111|0000|00000|0110| |
| 000001ea | 0111101010 | 8 e00600 | |10|0001|11111|0000|00000|0110| |
| 000001eb | 0111101011 | 87e00600 | |10|0001|11111|0000|00000|0110| |

-continued

| VLD Code | | Table Entry | |
|---|---|---|---|
| Hex | 10 bit | Hex | Binary |
| 000001ee | 0111101100 | 87e00600 | \|10\|0001\|11111\|0000\|00000\|0110\| |
| 000001ed | 0111101101 | 87e00600 | \|10\|0001\|11111\|0000\|00000\|0110\| |
| 000001ee | 0111101110 | 87e00600 | \|10\|0001\|11111\|0000\|00000\|0110\| |

Page 9

The first few entries in the right hand column are all x's representing the escape codes for all the symbols that require greater than 10 bits. Following that are the columns containing the entry code run, level, run, level, ..., and shift or count fields. These two pages are simply illustrative of the codes and table entries for an inspection field of ten bits generated with respect to Table B-14.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A variable length decoder system for simultaneously decoding one or more variable length code symbols comprising:
   a bit FIFO for storing at least a portion of a variable length coded bit stream;
   an addressing device for defining an inspection field in said portion of a variable length coded bit stream;
   a look-up table for storing a decode value uniquely addressable to each bit combination of said inspection field and being responsive to said addressing device for reading out the plurality of code words corresponding to the unique address defined by said inspection field.

2. The variable length decoder system of claim 1 in which said addressing device includes an addressor for applying said inspection field as said unique address.

3. The variable length decoder system of claim 2 in which said addressing device includes a data register for storing a succession of extracted bit fields of predetermined bit length from said variable length coded bit stream in said bit FIFO and said addressor defines a plurality of inspection fields in said extracted bit field; said addressing device selecting a number of successive inspection field in each said extracted bit field before the next successive extracted field is stored in said data register.

4. The variable length decoder system of claim 1 in which said look-up table includes an entry field defining the number of code words or escape code in the addressed inspection field.

5. The variable length decoder system of claim 1 in which said look-up table includes a run field and a level field for each code word in the addressed inspection field and a shift field, said level field containing the coefficient value, said run field containing the of zero-run to the next non-zero coefficient and said shift field containing the count of the bits representing the code words.

6. The variable length decoder system of claim 4 in which said code words include complete code words and partially decoded escape code words.

7. The variable length decoder system of claim 6 in which said escape code word includes an escape code in said entry field identifying that the code word bit count exceeds the size of said inspection field.

8. The variable length decoder system of claim 6 in which said escape code word includes a bit number field identifying the number of additional bits needed to complete that code word and an offset field pointing to a next table address where the additional bits are decoded.

9. The variable length decoder system of claim 3 in which said data register is one of the register files of a compute unit.

10. The variable length decoder system of claim 1 further including a low water mark register for identifying when said bit FIFO must be refilled from the variable length coded bit stream.

11. The variable length decoder system of claim 10 in which said bit FIFO is refilled with said variable length coded bit stream from an external storage.

12. The variable length decoder system of claim 10 in which said low water mark register is included as a part of said bit FIFO.

13. The variable length decoder system of claim 10 in which said low water mark register marks the number of bits in the FIFO and generates a low water mark signal if the remaining bits in FIFO are below that number.

14. The variable length decoder system of claim 3 further including a low water mark register for identifying when said bit FIFO must be refilled from the variable length coded bit stream.

15. A variable length decoder system for simultaneously decoding one or more variable length code symbols comprising:
   a bit FIFO for storing at least a portion of a variable length coded bit stream;
   a data register for storing a succession of extracted bit fields of predetermined bit length from said variable length coded bit stream in said bit FIFO.
   an addressing device for defining at least one inspection field in said extracted bit field; and
   a look-up table for storing a decode value uniquely addressable by each bit combination of said inspection field and being responsive to said addressing device for reading out the plurality of code words corresponding to the unique address defined by said inspection field; said addressing device selecting a number of successive inspection fields in each said extracted bit field before the next successive extracted field is stored in said data register.

16. The variable length decoder system of claim 15 in which said addressing device includes an addressor for applying said inspection field as said unique address.

17. The variable length decoder system of claim 15 in which said look-up table includes an entry field defining the number of code words in the addressed inspection field.

18. The variable length decoder system of claim 15 in which said look-up table includes a run field and a level field for each code word in the addressed inspection field and a shift field, said level field containing the coefficient value, said run field containing the number of bits to the next non-zero bit and said shift field containing the count of the bits representing the code words.

19. The variable length decoder system of claim 18 in which said code words include symbol code words and escape code words.

20. The variable length decoder system of claim 18 in which said escape code word includes an escape code in said entry field identifying that the code word bit count exceeds the size of said inspection field.

21. The variable length decoder system of claim 20 in which said escape code word includes a bit number field identifying the number of additional bits needed to complete that code word and an offset field pointing to the storage address where the additional bits are located.

22. The variable length decoder system of claim 15 in which said data register is one of the register files of a compute unit.

23. The variable length decoder system of claim 15 further including a low water mark register for identifying when said bit FIFO must be refilled from the variable length coded bit stream.

24. The variable length decoder system of claim 23 in which said bit FIFO is refilled with said variable length coded bit stream from an external storage.

25. The variable length decoder system of claim 23 in which said low water mark register is included as a part of said bit FIFO.

26. The variable length decoder system of claim 23 in which said low water mark register marks the number of bits in the extraction field and generates a low water mark signal if the bits are below that number.

27. A variable length decoder method for simultaneously decoding one or more variable length code symbols comprising:
    storing in a bit FIFO at least a portion of a variable length coded bit stream;
    defining an inspection field in said portion of a variable length coded bit stream;
    storing in a look-up table a decode value uniquely addressable to each bit combination of said inspection field for reading out the plurality of code words corresponding to the unique address defined by said inspection field.

28. The variable length decoder method of claim 27 including applying said inspection field as said address.

29. The variable length decoder method of claim 28 includes storing a succession of extracted bit fields of predetermined bit length from said variable length coded bit stream; defining a plurality of inspection fields in said extracted bit field; selecting a number of successive inspection fields in each said extracted bit field before the next successive extracted field is stored in said data register.

30. The variable length decoder method of claim 27 in which said look-up table includes an entry field defining the number of code words in the addressed inspection field.

31. The variable length decoder method of claim 27 in which said look-up table includes a run field and a level field for each code word in the addressed inspection field and a shift field, said level field containing the coefficient value, said run field containing the number of bits to the next non-zero bit and said shift field containing the count of the bits representing the code words.

32. The variable length decoder method of claim 30 in which said code words include symbol code words and escape code words.

33. The variable length decoder method of claim 32 in which said escape code word includes an escape code in said entry field identifying that the code word bit count exceeds the size of said inspection field.

34. The variable length decoder method of claim 32 in which said escape code word includes a bit number field identifying the number of additional bits needed to complete that code word and an offset field pointing to the storage address where the additional bits are located.

35. A variable length decoder method for simultaneously decoding one or more variable length code symbols comprising:
    storing in a bit FIFO at least a portion of a variable length coded bit stream;
    storing a succession of extracted bit fields of predetermined bit length from said variable length coded bit stream in said bit FIFO;
    defining at least one inspection field in said extracted bit field; and
    storing in a look-up table a decode value uniquely addressable by each bit combination of said inspection field for reading out the plurality of code words corresponding to the unique address defined by said inspection field and selecting a number of successive inspection fields in each said extracted bit field before the next successive extracted field is stored.

36. The variable length decoder method of claim 35 including applying said inspection field as said address.

37. The variable length decoder method of claim 35 in which said look-up table includes an entry field defining the number of code words in the addressed inspection field.

38. The variable length decoder method of claim 35 in which said look-up table includes a run field and a level field for each code word in the addressed inspection field and a shift field, said level field containing the coefficient value, said run field containing the number of bits to the next non-zero bit and said shift field containing the count of the bits representing the code words.

39. The variable length decoder method of claim 38 in which said code words include symbol code words and escape code words.

40. The variable length decoder method of claim 39 in which said escape code word includes an escape code in said entry field identifying that the code word bit count exceeds the size of said inspection field.

41. The variable length decoder method of claim 40 in which said escape code word includes a bit number field identifying the number of additional bits needed to complete that code word and an offset field pointing to the storage address where the additional bits are located.

* * * * *